(12) United States Patent
Strandell

(10) Patent No.: US 10,737,354 B2
(45) Date of Patent: Aug. 11, 2020

(54) BEARING COMPONENT

(71) Applicant: Aktiebolaget SKF, Göteborg (SE)

(72) Inventor: Ingemar Strandell, Sävedalen (SE)

(73) Assignee: AKTIEBOLAGET SKF, Gothenburg (SE)

( * ) Notice: Subject to any disclaimer, the term of this patent is extended or adjusted under 35 U.S.C. 154(b) by 103 days.

(21) Appl. No.: 15/840,053

(22) Filed: Dec. 13, 2017

(65) Prior Publication Data

US 2018/0099351 A1 Apr. 12, 2018

Related U.S. Application Data

(62) Division of application No. 14/783,446, filed as application No. PCT/SE2014/000041 on Apr. 7, 2014, now Pat. No. 9,878,396.

(30) Foreign Application Priority Data

Apr. 9, 2013 (SE) ..................................... 1300258

(51) Int. Cl.
*B32B 5/14* (2006.01)
*B23K 20/227* (2006.01)
(Continued)

(52) U.S. Cl.
CPC ............ *B23K 20/227* (2013.01); *B23K 20/02* (2013.01); *B23K 20/021* (2013.01);
(Continued)

(58) Field of Classification Search
None
See application file for complete search history.

(56) References Cited

U.S. PATENT DOCUMENTS 1,896,411 A 2/1933 Maskrey
1,985,181 A 12/1934 Matthews
(Continued)

FOREIGN PATENT DOCUMENTS

CA 2615882 A1 11/2006
CN 1041900 C 5/1990
(Continued)

OTHER PUBLICATIONS

International Preliminary Report on Patentability dated Oct. 13, 2015 in parent patent application No. PCT/SE2014/000041.
(Continued)

*Primary Examiner* — Seth Dumbris
(74) *Attorney, Agent, or Firm* — J-Tek Law PLLC; Jeffrey D. Tekanic; Scott T. Wakeman

(57) ABSTRACT

A bearing component including a first metallic material and a second metallic material. The first metallic material provides a first carbon content and the second metallic material presents a second carbon content. The first metallic material and the second metallic material have been joined by a diffusion welding process. The diffusion welding process results in a transition zone with a varying carbon content between the first metallic material and the second metallic material. Varying carbon content in the transition zone is within an interval and the interval end points are defined by the carbon contents of the first metallic material and the second metallic material.

19 Claims, 3 Drawing Sheets

(51) Int. Cl.
  *F16C 33/34* (2006.01)
  *B23K 20/02* (2006.01)
  *F16C 33/64* (2006.01)
  *F16C 33/62* (2006.01)
  *B23K 20/22* (2006.01)
  *B23K 103/04* (2006.01)
  *B23K 103/18* (2006.01)

(52) U.S. Cl.
  CPC ............ *B23K 20/023* (2013.01); *B23K 20/22* (2013.01); *F16C 33/34* (2013.01); *F16C 33/62* (2013.01); *F16C 33/64* (2013.01); *B23K 2103/04* (2018.08); *B23K 2103/05* (2018.08); *B23K 2103/18* (2018.08); *F16C 2204/62* (2013.01); *F16C 2204/64* (2013.01); *F16C 2226/36* (2013.01); *Y10T 428/12458* (2015.01)

(56) References Cited

U.S. PATENT DOCUMENTS

| | | |
|---|---|---|
| 2,033,240 A | 3/1936 | Hardy |
| 2,102,394 A | 12/1937 | Trembour |
| 2,438,759 A | 3/1948 | Liebowitz |
| 2,474,682 A | 6/1949 | Liebowitz |
| 2,765,520 A | 10/1956 | Donley |
| 3,142,560 A | 7/1964 | Storchheim |
| 3,403,010 A | 9/1968 | Macdonald et al. |
| 3,475,812 A | 11/1969 | Kennedy et al. |
| 3,632,368 A | 1/1972 | Nelson |
| 3,693,242 A | 9/1972 | Chivinsky |
| 3,748,722 A | 7/1973 | Moore |
| 3,862,484 A | 1/1975 | Chivinsky |
| 3,915,666 A | 10/1975 | Veitl |
| 3,944,396 A | 3/1976 | Chivinsky |
| 4,429,824 A | 2/1984 | Woodward |
| 4,699,309 A | 10/1987 | Atsuta et al. |
| 4,703,885 A | 11/1987 | Lindgren et al. |
| 4,795,078 A | 1/1989 | Kuroki et al. |
| 5,056,936 A | 10/1991 | Mahrus et al. |
| 5,271,546 A | 12/1993 | Hardwick |
| 5,306,565 A | 4/1994 | Corbin et al. |
| 5,403,670 A | 4/1995 | Ohsue et al. |
| 5,543,236 A | 8/1996 | Tanaka et al. |
| 5,648,176 A | 7/1997 | Nakagawa et al. |
| 5,683,822 A | 11/1997 | Hasegawa et al. |
| 5,759,300 A | 6/1998 | Hasegawa et al. |
| 5,919,577 A | 7/1999 | Hasegawa et al. |
| 6,059,175 A | 5/2000 | Hamada et al. |
| 6,109,504 A | 8/2000 | Groll |
| 6,589,671 B1 | 7/2003 | Kehrer |
| 6,689,328 B1 | 2/2004 | Otani et al. |
| 7,857,518 B2 | 2/2010 | Beer |
| 9,555,500 B2 | 1/2017 | Strandell |
| 9,555,501 B2 | 1/2017 | Strandell |
| 9,694,439 B2 | 7/2017 | Strandell |
| 9,850,950 B2 | 12/2017 | Strandell |
| 2001/0043892 A1 | 11/2001 | Matsuoka |
| 2001/0055695 A1 | 12/2001 | Sato et al. |
| 2002/0142186 A1 | 10/2002 | Sato et al. |
| 2002/0174545 A1 | 11/2002 | Kiyosawa |
| 2003/0134144 A1 | 7/2003 | Muroshige et al. |
| 2005/0217420 A1 | 10/2005 | Kobayashi et al. |
| 2006/0035082 A1 | 2/2006 | Hattori et al. |
| 2006/0163321 A1 | 7/2006 | Hasegawa et al. |
| 2006/0243353 A1 | 11/2006 | Milam |
| 2007/0214644 A1 | 9/2007 | Kanai et al. |
| 2008/0212911 A1 | 9/2008 | Beer et al. |
| 2008/0296354 A1 | 12/2008 | Crockett |
| 2009/0180725 A1 | 7/2009 | Gatehouse et al. |
| 2009/0208773 A1 | 8/2009 | Dupont |
| 2010/0227188 A1 | 9/2010 | Takayama |
| 2010/0247949 A1 | 9/2010 | VanDyke et al. |
| 2011/0311362 A1 | 12/2011 | Corts |
| 2012/0177527 A1 | 7/2012 | Kerrigan |
| 2012/0248859 A1 | 10/2012 | Knopf et al. |
| 2014/0197678 A1 | 7/2014 | Olivieri et al. |
| 2014/0346216 A1* | 11/2014 | Rigal .................. B23K 20/021 228/194 |
| 2015/0167131 A1 | 6/2015 | Bullard et al. |
| 2016/0303682 A1 | 10/2016 | Strandell |
| 2016/0303683 A1 | 10/2016 | Strandell |
| 2016/0312831 A1 | 10/2016 | Strandell |
| 2016/0318118 A1 | 11/2016 | Strandell |
| 2016/0318119 A1 | 11/2016 | Strandell |

FOREIGN PATENT DOCUMENTS

| | | |
|---|---|---|
| CN | 1559740 A | 1/2005 |
| CN | 100420526 C | 9/2008 |
| CN | 101497148 A | 8/2009 |
| CN | 101564793 A | 10/2009 |
| CN | 102039484 A | 5/2011 |
| DE | 2328714 A1 | 1/1975 |
| EP | 0847826 A1 | 6/1998 |
| EP | 0863323 A1 | 9/1998 |
| EP | 1131989 A2 | 9/2001 |
| FR | 1517274 A | 3/1968 |
| GB | 729720 A | 5/1955 |
| GB | 2232726 A | 12/1990 |
| JP | S5474250 A | 6/1979 |
| JP | S58128281 A | 7/1983 |
| JP | S62176659 A | 8/1987 |
| JP | H01202381 A | 8/1989 |
| JP | H0331425 A | 2/1991 |
| JP | H0976077 A | 3/1997 |
| JP | 2000186714 A | 7/2000 |
| JP | 2000326077 A | 11/2000 |
| JP | 2002069563 A | 3/2002 |
| JP | 2004243380 A | 9/2004 |
| JP | 2005169419 A | 6/2005 |
| JP | 2005169420 A1 | 6/2005 |
| JP | 2008291316 A | 12/2008 |
| SU | 633690 A1 | 11/1978 |
| SU | 706216 A | 12/1979 |
| WO | 9527586 A1 | 10/1995 |
| WO | 2010064145 A2 | 6/2010 |
| WO | 2013092413 A1 | 6/2013 |

OTHER PUBLICATIONS

Office Action dated Aug. 10, 2016 in related U.S. Appl. No. 14/783,448 and examined claims.
International Search Report dated Jun. 24, 2014 in parent patent application No. PCT/SE2014/000041.
International Search Report dated Jun. 26, 2014 in related patent application No. PCT/SE2014/000038.
International Search Report dated May 30, 2014 in related patent application No. PCT/SE2014/000042.
Office Action and Search Report from the Chinese Patent Office dispatched Mar. 14, 2017 in counterpart CN application No. 201480031825.8, and translation thereof.
Office Action and Search Report from the Chinese Patent Office dispatched Apr. 6, 2017 in related Chinese application No. 201480031618.2, and translation thereof.
International Search Report dated Sep. 7, 2014 in related patent application No. PCT/SE2014/000043.

* cited by examiner

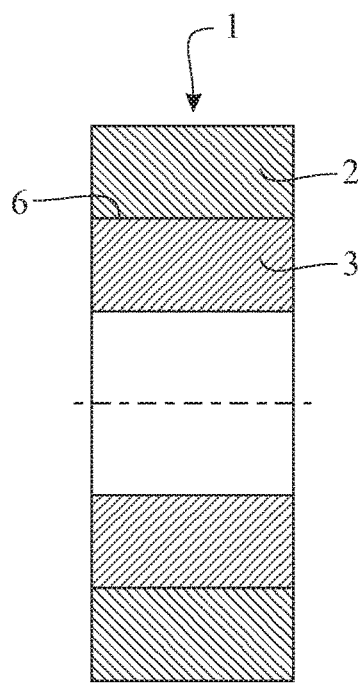
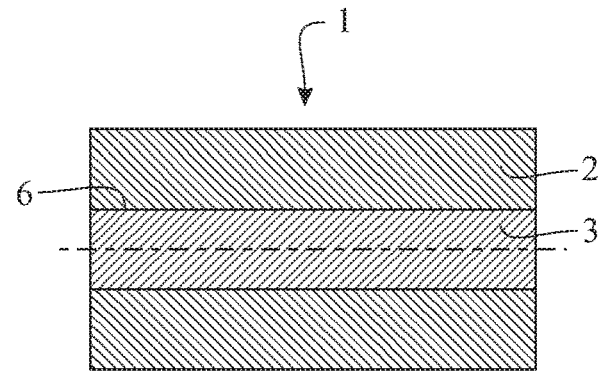
FIG. 1a  FIG. 1b
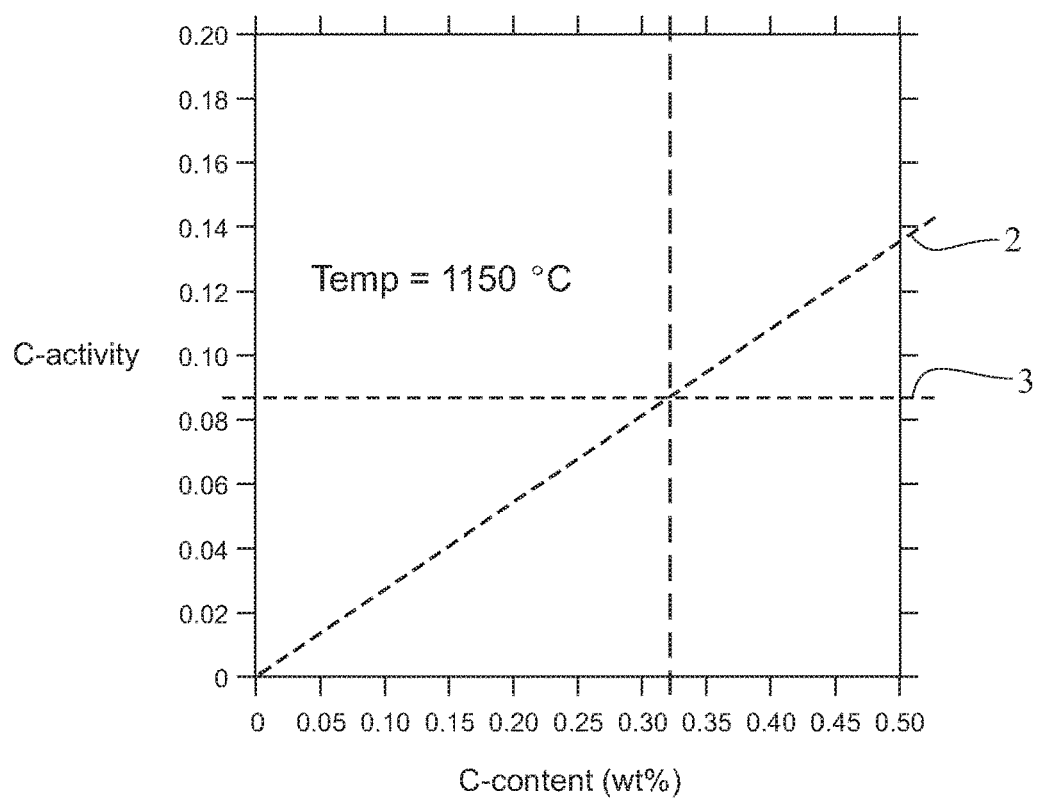
FIG. 2

BEARING COMPONENT

CROSS REFERENCE TO RELATED APPLICATION

This Application is a Divisional of U.S. application Ser. No. 14/783,446 filed on Oct. 9, 2015, which is a US National Stage Application filed under 35 U.S.C. 371 claiming the benefit of International Application Number PCT/SE2014/000041 filed on Apr. 7, 2014, which claims the benefit of Swedish (SE) Patent Application Number 1300258-9 filed on Apr. 9, 2013.

TECHNICAL FIELD

According to a first aspect, the invention presents a bearing component, such as an outer ring, an inner ring or a roller of a roller bearing.

BACKGROUND OF THE INVENTION

Forming a bearing component by joining two materials by diffusion welding and hot isostatic pressing is known.

SUMMARY OF THE INVENTION

An object of the invention is to provide an improved bearing component.

According to the first aspect of the invention, the object has been achieved by providing a bearing component that has a first and a second metallic material wherein the first material presents a first carbon content and the second material presents a second carbon content. The first and second material have been joined by a diffusion welding process, wherein the diffusion welding process has resulted in a transition zone between the first and second material with a varying carbon content. The varying carbon content in the transition zone is essentially within an interval which end points are defined by the carbon content of the first and second material. It might easily be a small increase/decrease of carbon content at the edges of the transition zone, but it should not extend from the interval end points more than 5% of the total interval. When the carbon content is not essentially above or below the content of the first and the second material, it is an indication that the carbon has not reacted to form cementites or other complex metal or iron carbides that are hard and brittle. The strength of the transition zone is thus ensured.

The inventor has realized that the known methods to join two materials to form a bearing component by diffusion welding or hot isostatic pressing are sensitive to generate weak zones in the transition zone where the materials join each other, especially when joining materials of different qualities, such as cheaper cast steel with a high quality tool steel. One of the two joined materials may gain carbon in the joining process while the other material may lose carbon. The carbon gradients in the two materials may result in weak and brittle phases during a subsequent heat treatment. A transition zone with larger fraction of weaker brittle microstructure phases such as cementite networks or other complex metal carbides may significantly reduce the strength of any or both of the two joined materials. By selecting the alloying content of the two joining materials and/or adopting the process temperature the diffusion rate of carbon between the materials can be reduced. The hardening properties of both alloys are then to a large extent preserved and the volumes surrounding the transition zone will not have large volume of weak or brittle phases. The two materials keep its ability and microstructure all the way to the transition zone. The size of the transition zone is reduced and the potential problems of material brittleness etc. are reduced. The actual interface may still have less strength than the two joined materials. The original surface oxides and surface contaminations may still contribute to a strength reduction in the joining weld. This puts additional demands on process skill and surface preparations before process start. The problem with surface contaminations can for instance be reduced by careful surface cleaning and surface activation by the surfaces to be joined before, for instance by etching or any other means such as machining, grinding or blasting.

Carbon activity is a central term used to describe the invention. A carbon potential is explained by the ability of an environment containing active carbon to alter or maintain, under prescribed conditions, the carbon level of a steel. In any particular environment, the carbon level attained will depend on such factors as temperature, time and steel composition. Carbon potential is thus a difference in carbon activity between e.g. two materials. Thus if there is a difference in carbon activity, i.e. when the carbon potential is not zero, the carbon will diffuse from one material to the other.

The two materials to be joined have different carbon contents. Those carbon contents define the end points of the interval of carbon there between. By carbon content is meant the medium value in the material. The carbon content may naturally vary and have local variations both in the material as such but in particular around the circumferential surface of the bearing component, but what is meant is the overall medium value of the material. As an example; when joining a material with 3 weight percent (wt %) carbon with a 1 wt % carbon material, the interval is 2 wt % carbon and the interval end points are 3 and 1 wt % carbon, hence the same as the medium carbon value of the first and the second material. The transition zone is the area where the change in carbon content due to the joining process can be observed in the materials.

Exemplifying and advantageous embodiments of the bearing component according to the first aspect of the invention will now be presented.

According to an embodiment of the bearing component the varying carbon content in the transition zone between the first and the second material is essentially linear. By linear change in carbon content is meant that the measured carbon content in the transition zone does not vary by having less carbon content and then suddenly having increased carbon content, i.e. the plotted carbon content profile should not vary between a positive and negative derivative to a large extent. Thus by linear is also meant a sudden change from the carbon content of one material to the other, which is the preferred profile, as long as it does not vary largely along the way. The carbon content shall be measured along the cross section of a bearing component, the cross section being made perpendicular to the surface where the two materials join. Having this said, the surface to be joined does by no means need to be flat, since also rounded surfaces have a perpendicular direction. Having a linear transition of the varying carbon content is an even clearer indication that the carbon has not reacted to form cementites or other complex metal or iron carbides that are hard and brittle. There may be small variations, but any un-linear change, i.e. where the plotted carbon content curve goes from positive to negative to positive again or vice versa, of carbon content in the transition zone should be less than 50% of the carbon content interval, preferably less than 25% than the total interval defined by the carbon content of the two materials. This generates a transition zone that has the potential to be strong.

In an embodiment of the bearing component, at least 80% of the change in carbon content between the first and second material takes place within a distance of less than 200 μm as measured perpendicularly to the joining surface (interface). In another embodiment of the bearing component, at least 80% of the total change in carbon content takes place within a distance of 100 μm as measured perpendicularly to the joining surface (interface). This describes a sudden change from the carbon content of one material to the other, which is the preferred profile, since the joining process has not affected the properties of the materials to a large extent, but is limited to small portion (narrow thickness) of the overall component. This sudden change also results in a strengthened transition zone and improved overall quality of the bearing component.

In an embodiment of the bearing component one of the materials is a bearing steel. Of special interest are corrosion resistant and/or wear resistant steels. In an embodiment one of the materials is a M50 steel. In a further embodiment one of the materials is a M50NIL steel. In yet another embodiment one of the materials is any of the traditional bearing steel as shown in ISO 683-17:1999(E) pages 9-10. Any other steels that meet the steel cleanliness and hardness requirements of a bearing component could be used, for instance stainless tool steels. In a further embodiment the material used is a martensitic hardenable stainless N-alloyed steel, such as XD15NW or stainless martensitic hardened made with good steel cleanliness and suitable for surface enrichment. The invention is however not limited to these steels. The benefit of using these types of steel is that the portion consisting of this material will be very robust against wear and corrosion for instance. Hence the high quality bearing steel is preferably located around the highly stressed areas of the bearing components, for instance around the raceway of the rings or the rolling surface of the roller. It could also be located for instance at a flange or any other portion or area of the bearing component, or combinations of flange, raceways and rolling surfaces.

In an embodiment the bearing component is an inner ring, an outer ring or a roller of a roller bearing. The component could belong to any bearing type, such as a spherical roller bearing, cylindrical roller bearing, or tapered roller bearing or deep groove ball type bearings. It can be radial bearings as well as axial thrust type bearings, and bearings having single row or several rows of rolling elements. It can be axial and radial ball bearings with a single row or several rows of balls.

According to the second aspect of the invention, the object has been achieved by providing a method to form a bearing component according to the first aspect of the invention. The method to form a bearing component comprises steps of heating the first and second material, pressing them against each other under specific pressure, period of time and temperature, thereby allowing the materials to diffuse into each other. Further, the first material presents a carbon activity of 80-120% of the carbon activity of the second material at the temperature of joining. In another embodiment of the bearing component forming method, the carbon activity of one of the materials to be joined is 90-110% of the other material. In a further embodiment of the bearing component forming method, the carbon activity of one of the materials to be joined is 95-105% of the other material. In yet another embodiment, the carbon activity is essentially the same as the other material at the temperature of joining, but it could also be 99-101%, 98-102%, 97-103% of the other material. Carbon activity can be affected both by changing the carbon content in the material, with other alloying elements kept constant and/or by changing the temperature of the material. Both of these dimensions can be tampered with to adjust the carbon activity to optimize the bearing component forming method.

The benefit of having materials with the same or similar carbon activity is that the phenomena where one of the two joined materials gain carbon in the joining process, while the other material may lose carbon, is avoided. Hence there are no carbon gradients in the two materials from the process that may result in weak and brittle phases during a subsequent heat treatment. Since a transition zone with larger fraction of weaker brittle microstructure phases such as cementite networks or other complex metal carbides may significantly reduce the strength of any or both of the two joined materials, this ensures that the bearing component is robust and durable.

All aspects of the first aspect of the invention are applicable to all aspects of the second aspect of the invention and vice versa. Exemplifying and advantageous embodiments of the bearing component according to the second aspect of the invention will now be presented.

In an embodiment of the method to form a bearing component, the forming method is made by means of hot isostatic pressure. The materials are placed together and at the temperature, time and pressure as described more in the other embodiments of the invention.

In an embodiment of the method to form a bearing component, the temperature of joining is 1000-1300 degrees Celsius (C). In another embodiment of the method to form a bearing component, the temperature of joining is 1100-1200 degree C. In a further embodiment of the method to form a bearing component, the temperature of joining is 1140-1160 degree C., preferably 1150 degree C. But it could also be 1145-1155 degree C. for instance. In an embodiment of the method, the hot isostatic pressing is conducted during 1-6 hours, preferably during 2-4 hours.

In an embodiment of the method to form a bearing component, the pressure is 80-310 MPa.

In an embodiment of the method to form a bearing component, at least one of the first and the second material is in powder form before heating. In another embodiment, it is the bearing steel that is in powder form before heating. In a further embodiment of the method to form a bearing component, a sheet metal is used to encapsulate the powder during the joining process. The sheet metal is then removed. The sheet metal used as an example in this embodiment can be exchanged to any other suitable material known to the person skilled in the art.

In an embodiment of the bearing component forming method, the bearing component is an inner ring, an outer ring or a roller of a roller bearing. The component could belong to any bearing type, such as a spherical roller bearing, cylindrical roller bearing, tapered roller bearing or deep groove ball type bearings. It can be radial bearings as well as axial thrust type bearings, and bearings having single rows or several rows of rolling elements. It can be axial and radial ball bearings with a single row or several rows of balls.

In an embodiment of the bearing component forming method, the bearing component is made by joining a larger piece which is subsequently cut into smaller components. To form a ring a cylinder shaped element of one of the materials could be joined with another material, after which the cylindrical shaped element can be cut into ring elements. To form a roller a rod shaped element of one of the materials can be joined with the second material, and then cut into roller elements.

BRIEF DESCRIPTION OF DRAWINGS

Exemplifying embodiments will now be described more in detail with reference to accompanying drawings, as well as examples of undesirable features that the invention help to prevent, wherein FIG. 1a shows a cross section of a bearing ring made out of two materials according to the invention;

FIG. 1b shows a cross section of a roller for a bearing made out of two materials according to the invention;

FIG. 2 shows a graph illustrating two materials having the same carbon activity at a specific temperature. The carbon activity of the first material 2 is plotted while increasing its carbon content according to the invention;

Figure 3:
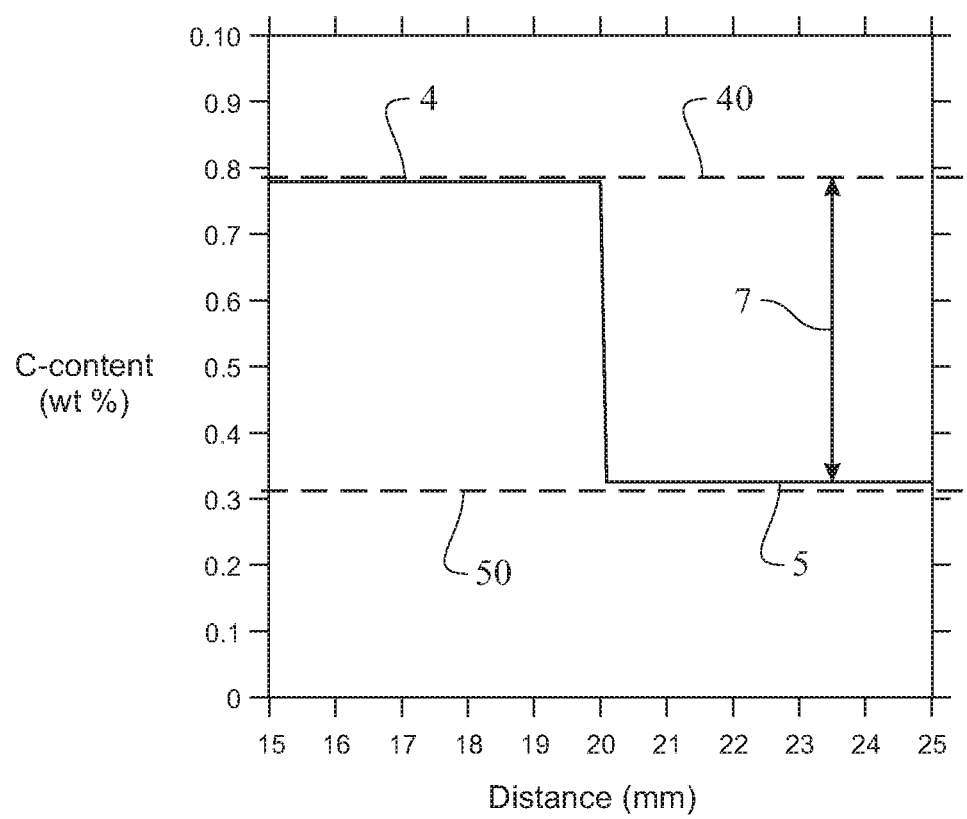
FIG. 3 shows a graph of a desirable sudden carbon content change according to the invention.

The drawings present examples of the invention, and the undesirable features that the invention helps to prevent, in diagrams and graphs. These are exemplifying embodiments, thus they are not drawn to scale. Some details and features may even be exaggerated to better explain the invention. The invention is not limited to the embodiments and drawings described herein.

DETAILED DESCRIPTION OF DRAWINGS

FIG. 1a shows a cross section of a bearing component 1 according to the invention, bearing component 1 being a ring. The bearing ring comprises a first 2 and a second 3 material wherein the diffusion welding process has resulted in a transition zone 6 between the first 2 and second 3 material. The figure shows a bearing ring, where the materials are aligned along the full width of the component, but it could also be so that one material is only applied on a selected portion of the component, such as for instance a raceway or a flange (not shown in figure).

FIG. 1b shows a cross section of a bearing component 1 according to the invention, bearing component 1 being a roller. The roller comprises a first 2 and a second 3 material wherein the diffusion welding process has resulted in a transition zone 6 between the first 2 and second material 3. The figure shows a roller where the materials are aligned along the full width of the component, but it could also be so that one material is only applied on a selected portion of the component, such as for instance the main rolling surface or at the edges of the roller, etc.

FIG. 2 shows a table illustrating two materials 2, 3 having the same carbon activity at a temperature of 1150 degrees Celsius (C). The carbon activity of the first material 2 is plotted while increasing its carbon content until the same carbon activity as the second material 3 is obtained. In this case the first material 2 needs to have a carbon content of 0.30-0.35 wt % to have the same carbon activity as the second material 3 of around 0.09 at the temperature of 1150 degrees C. Carbon activity can be affected both by changing the alloying content in the material, and by changing the temperature of the material. Both of these dimensions can be tampered with to adjust the carbon activity to optimize the bearing component 1 forming method. Hence an alternative way to optimize the carbon activity of the two materials if the carbon content of the materials to be joined is fixed, for instance if both materials are in solid form instead of one of them being in powder form, or if a specific alloy is needed, the temperature can be changed instead. The numbers of temperatures, carbon content and carbon activities given in this example can of course be different depending on the circumstances given with temperatures and materials to join etc.

FIG. 3 shows a graph of a desirable sudden carbon content change according to an embodiment of the invention. Here it can be clearly seen that the carbon content changes suddenly at a depth of 20 mm from the surface of the bearing component, and the sudden change clearly falls within (between) the end points 40, 50 of the interval (difference) 7 between the carbon contents 4, 5 of the first and second materials 2, 3; in this embodiment appropriately 0.3 wt % and 0.8 wt %. The carbon content has not increased at any points, which indicates that the carbon has not formed cementites or other forms of complex metal or iron carbides that can be larger than the surrounding structure, for instance a martensitic structure, and thus would be generally weaker than the surrounding materials. Such a weaker transition zone material is unacceptable in high performance mechanical components, such as high quality bearing components 1.

Figure 4:
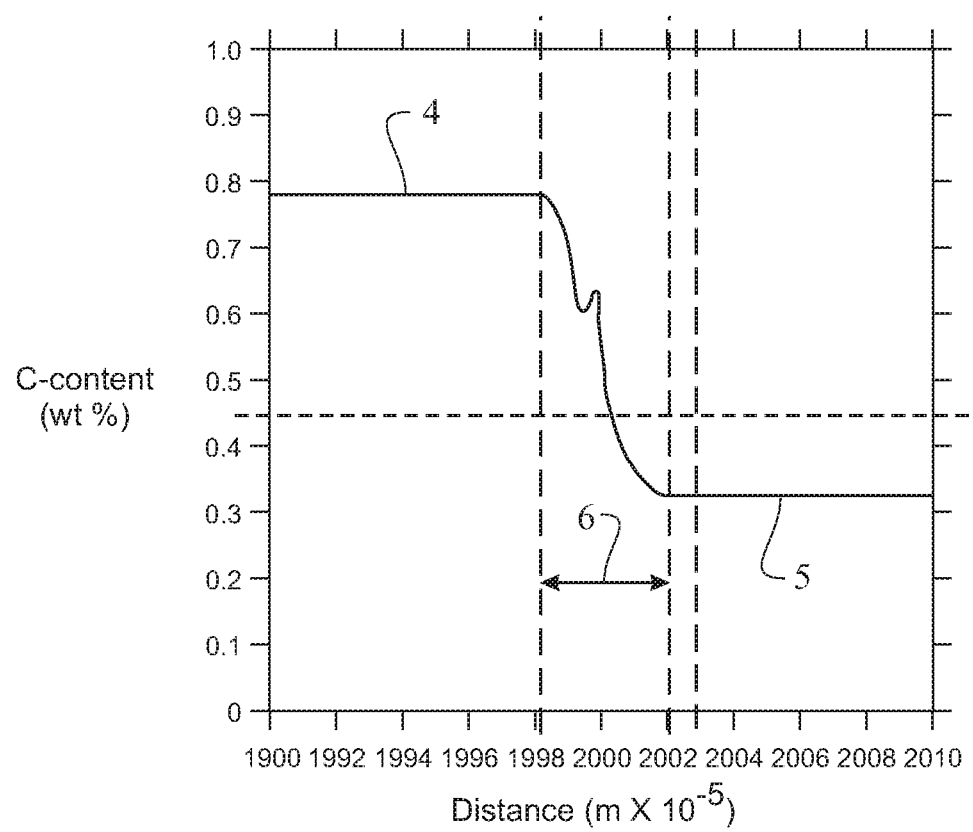
FIG. 4 shows a graph of the transition zone 6 of FIG. 3 on a μm level according to the invention.

FIG. 4 shows a graph of the desirable sudden carbon content change of FIG. 3 at an m*10$^{-5}$ level. FIG. 4 shows that, even though the carbon content changes in the transition zone 6 in an essentially linear manner, i.e. the profile or plotted curve of the measured carbon contents in the transition zone 6 do not vary between a positive and negative derivative when looking at this plotted curve of the carbon contents as measured perpendicularly from the interface of the two joined materials 4, 5, variations may be measured. Small variations occur naturally in the material, but measured variations could also be due to the equipment used in the measuring process, in particular how precise the measurements are. With reservation for these factors, any un-linear (non-linear) change of the carbon contents in the transition zone 6 should be less than 50% of the total difference (total change) of the carbon contents (i.e. the difference or interval 7 in FIG. 3) between the respective carbon contents 4, 5 of the two materials 2, 3, in this embodiment appropriately 0.3 wt % and 0.8 wt %. Preferably any non-linear change of the carbon contents in the transition zone 6 is less than 25% of the total difference (total change) between the carbon contents 4, 5 of the two materials 2, 3 (i.e. the difference or interval 7 in FIG. 3) It is also clear from the graph that more than 80% of the total change (total difference) in carbon contents takes place in the transition zone 6 within a measured (radial) distance of 50 μm (i.e. in the radial direction of the cross section of bearing component 1, i.e. in the radial dimension of the transition zone 6, as shown in FIG. 1b), or even within a (radial) distance of 40 μm.

Figure 5:
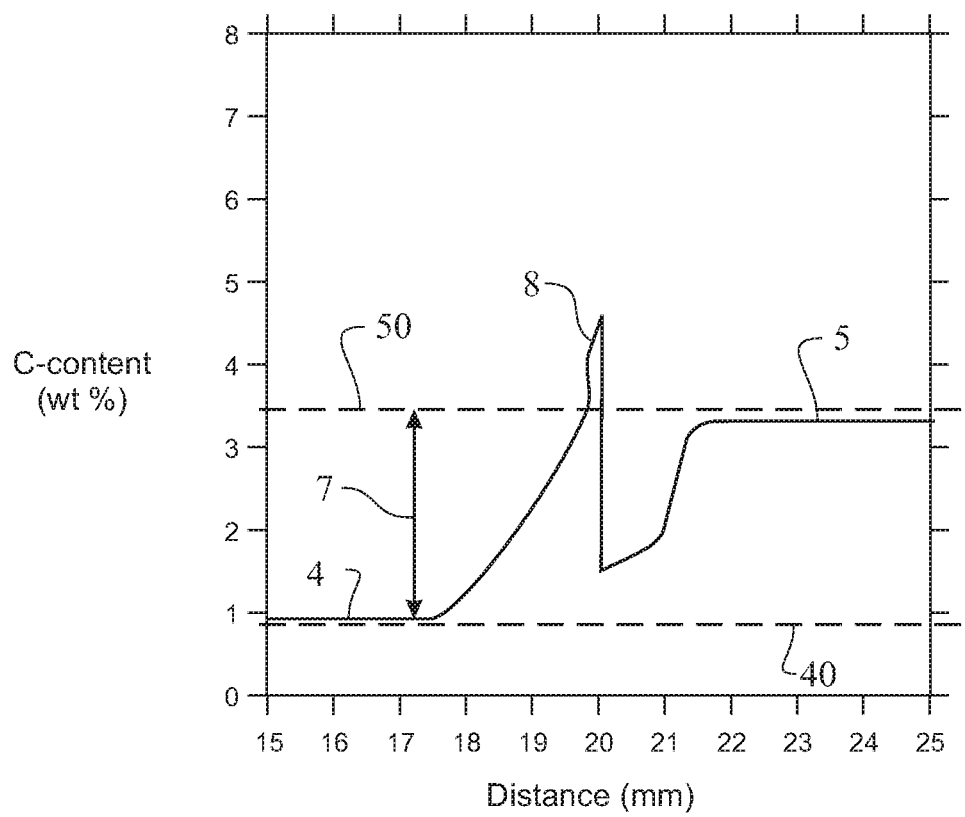
FIG. 5 shows a graph illustrating an undesirable carbon content change.

FIG. 5 shows a graph illustrating an undesirable peak 8 in carbon content. The carbon has clearly moved from one material to the other. The curve is un-linear and the carbon content clearly exceeds the interval 7 end points 40,50 defined by the carbon contents 4,5 of the materials, in this case roughly 1 wt % and 3.5 wt %. This happened at a depth of 20 mm from the surface of the bearing component.

Figure 6:
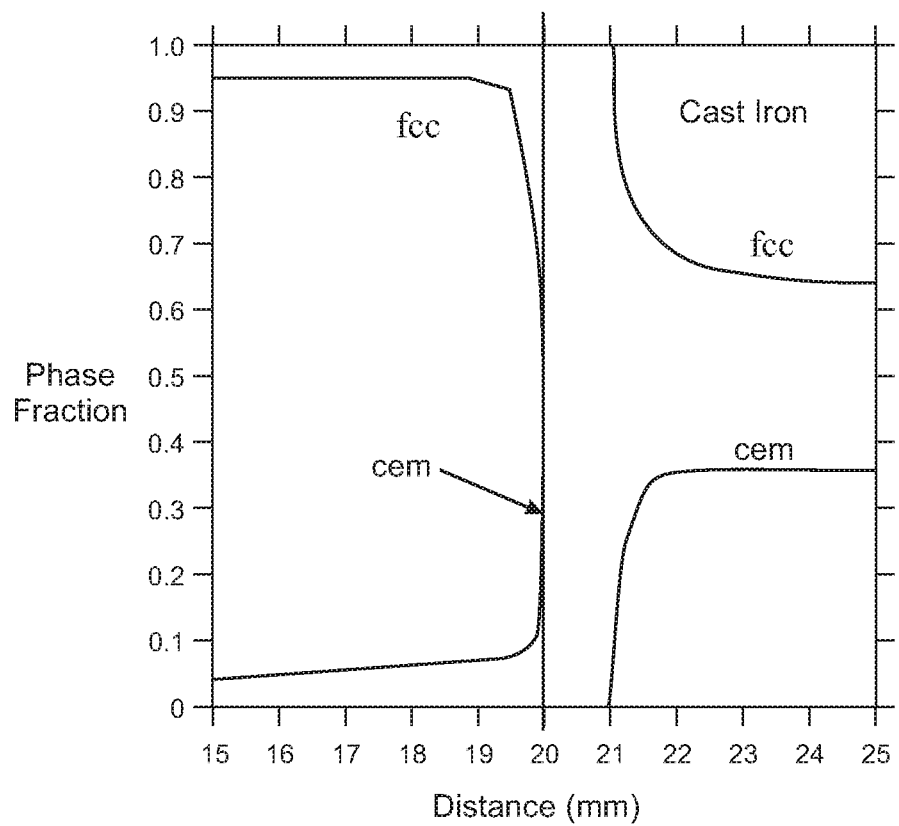
FIG. 6 shows a graph illustrating a phase fraction during the undesirable carbon content change from FIG. 5.

FIG. 6 shows a graph illustrating a phase fraction during the undesirable carbon content change from FIG. 5. It can be clearly seen that the carbon content increase that went beyond the interval (7 in FIG. 5) in an un-linear way, has resulted in a zone where the austenitic (fcc) microstructure has increased dramatically, simultaneously as larger fraction of weaker brittle microstructure phases such as cementite (cem) networks or more complex metal carbides has formed. Both microstructures went from being around 10% of the total microstructure to around 90% at a depth off 20 mm from the surface of the bearing component. This may significantly reduce the strength of any or both of the two joined materials. The cementite structure does not necessarily have to occur during the joining as such, but the higher level of carbon content could react and form a weak and brittle cementite phases during a subsequent heat treatment. At a depth off 21 mm from the surface of the bearing component we can see the normal face fractions of the materials again consisting of cementite and austenitic cast iron to a large extent.

The invention claimed is:

1. A bearing component comprising:
   a first metallic material and a second metallic material, wherein the first metallic material presents a first carbon content and the second metallic material presents a second carbon content,
   wherein:
   the first metallic material and the second metallic material have been joined by a diffusion welding process that has resulted in a transition zone between the first metallic material and the second metallic material,
   the transition zone has a varying carbon content that varies between first and second end points respectively defined by the first and second carbon contents,
   a difference between the first and second carbon contents is defined as a total change in carbon contents, and
   at least 80% of the total change takes place within a distance of less than 200 μm as measured perpendicularly to a joining interface between the first and second metallic materials.

2. The bearing component according to claim 1, wherein the varying carbon content in the transition zone between the first metallic material and the second metallic material varies in an essentially linear manner.

3. The bearing component according to claim 2, wherein any non-linear variation in the varying carbon content in the transition zone is less than 25% of the total change.

4. The bearing component according to claim 1, wherein at least 80% of the total change takes place within a distance of less than 100 μm as measured perpendicularly to the joining interface.

5. The bearing component according to claim 1, wherein at least one of the first and second metallic materials is a bearing steel.

6. The bearing component according to claim 5, wherein the bearing steel is one of:
   M50,
   M50 NIL,
   XD15NW,
   Bearing steel as shown in ISO 683-17:1999(E) pages 9-10,
   Stainless tool steel,
   Stainless steel suitable for martensitic hardening,
   N-alloyed stainless steel, suitable for martensitic hardening, or
   Stainless steel suitable for surface enrichment and martensitic hardening.

7. The bearing component according to claim 1, wherein the bearing component is one of:
   an inner ring of a bearing,
   an outer ring of the bearing, or
   a roller of a roller bearing.

8. The bearing component according to claim 1, wherein at least 80% of the total change takes place within a distance of less than 50 μm as measured perpendicularly to the joining interface.

9. A bearing component comprising:
   a first metallic layer having a first carbon content, and
   a second metallic layer having a second carbon content, the first carbon content differs from the second carbon content by an amount defined as a total carbon content difference,
   wherein the first metallic material is joined to the second metallic material by a diffusion weld that includes a transition zone encompassing a joining interface between the first and second metallic materials,
   the transition zone has a varying carbon content that transitions from the first carbon content to the second carbon content amount in a direction perpendicular to the joining interface, and
   at least 80% of the total carbon content difference takes place within a distance of less than 200 μm within the transition zone as measured perpendicularly to joining interface.

10. The bearing component according to claim 9, wherein at least one of the first and second metallic materials is a bearing steel.

11. The bearing component according to claim 10, wherein the bearing steel is one of:
    M50,
    M50 NIL,
    XD15NW,
    Bearing steel as shown in ISO 683-17:1999(E) pages 9-10,
    Stainless tool steel,
    Stainless steel suitable for martensitic hardening,
    N-alloyed stainless steel, suitable for martensitic hardening, or
    Stainless steel suitable for surface enrichment and martensitic hardening.

12. The bearing component according to claim 11, wherein the bearing component is one of:
    an inner ring of a bearing,
    an outer ring of the bearing, or
    a roller of a roller bearing.

13. The bearing component according to claim 12, wherein at least 80% of the total carbon content difference takes place within a distance of less than 100 μm within the transition zone as measured perpendicularly to joining interface.

14. The bearing component according to claim 13, wherein the varying carbon content transitions from the first carbon content to the second carbon content amount in an essentially linear manner.

15. The bearing component according to claim 14, wherein any non-linear variation in the varying carbon content in the transition zone is less than 25% of the total carbon content difference.

16. The bearing component according to claim 15, wherein at least 80% of the total carbon content difference takes place within a distance of less than 50 μm within the transition zone as measured perpendicularly to joining interface.

17. The bearing component according to claim 9, wherein the varying carbon content transitions from the first carbon content to the second carbon content amount in an essentially linear manner.

18. The bearing component according to claim 17, wherein any non-linear variation in the varying carbon content in the transition zone is less than 25% of the total carbon content difference.

19. The bearing component according to claim 9, wherein at least 80% of the total carbon content difference takes place within a distance of less than 50 μm within the transition zone as measured perpendicularly to joining interface.

\* \* \* \* \*